United States Patent [19]

Hansen

[11] Patent Number: 4,573,608

[45] Date of Patent: Mar. 4, 1986

[54] BABY CHANGING APPARATUS

[76] Inventor: Nancy Hansen, Box 57, Hadar, Nebr. 68738

[21] Appl. No.: 684,158

[22] Filed: Dec. 20, 1984

Related U.S. Application Data

[63] Continuation of Ser. No. 445,022, Nov. 29, 1982, abandoned.

[51] Int. Cl.$^4$ .......... B65G 59/06

[52] U.S. Cl. .......... 221/92

[58] Field of Search .......... 194/57, 58, 65, 9 T, 194/93, 79, 80, 10; 221/96, 268, 92; 242/55, 53

[56] References Cited

U.S. PATENT DOCUMENTS

| | | | |
|---|---|---|---|
| 1,612,132 | 12/1926 | Lannom | 312/313 X |
| 3,730,321 | 5/1973 | Akin | 194/9 T |
| 3,865,271 | 2/1975 | Gold | 221/96 |
| 4,046,243 | 9/1977 | Valentine | 194/10 |

*Primary Examiner*—Stanley H. Tollberg

*Attorney, Agent, or Firm*—Trexler, Bushnell & Wolters, Ltd.

[57] ABSTRACT

A baby changing apparatus is provided in the form of a coin-operated vending machine having a fold down table on which the baby may be placed while his diaper is changed. Paper towelling is provided for the table, and a safety belt restrains the baby from rolling off the table. The apparatus vends a package containing a fresh disposable diaper and various accessories.

4 Claims, 3 Drawing Figures

FIG. 1
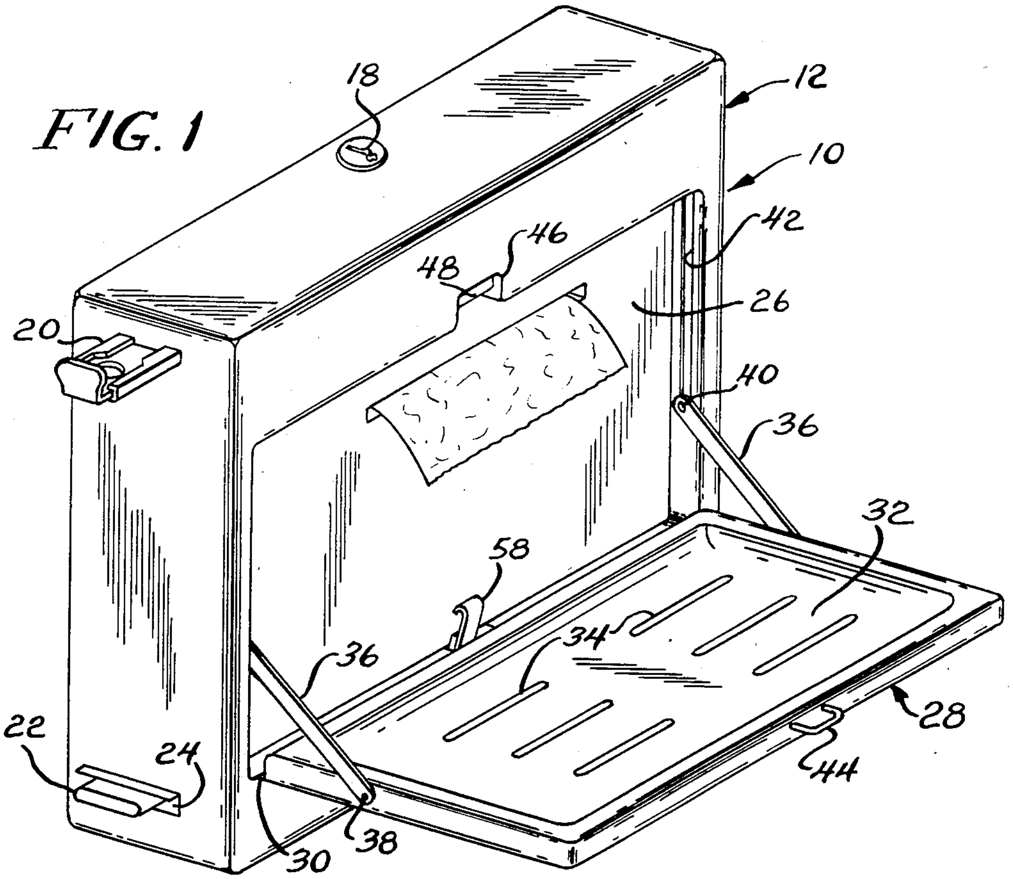
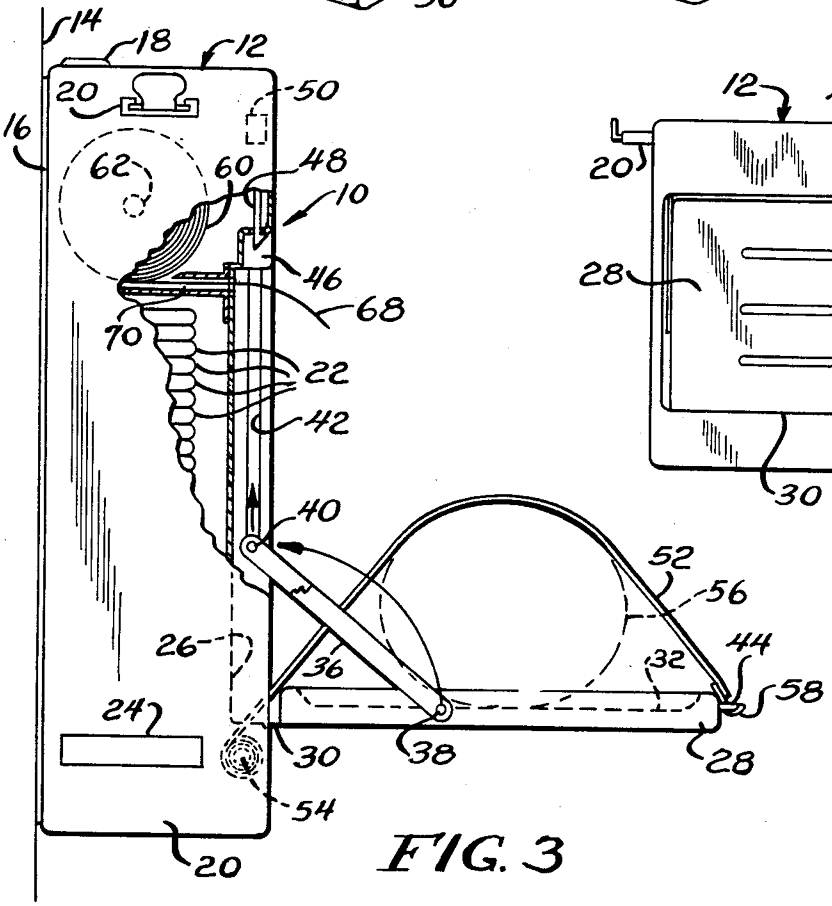
FIG. 3
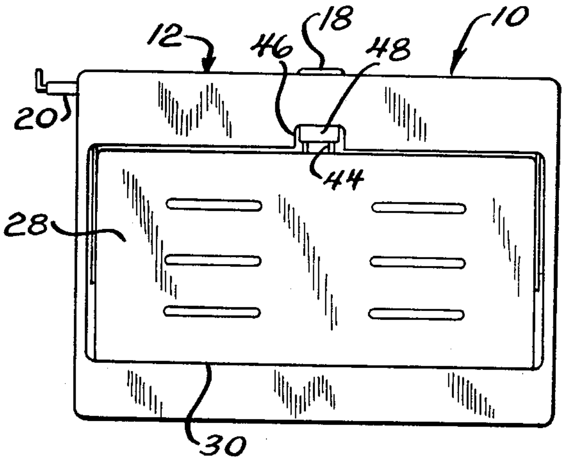
FIG. 2

BABY CHANGING APPARATUS

This application is a continuation of application Ser. No. 445,022, filed Nov. 29, 1982, abandoned.

BACKGROUND OF THE INVENTION

As is well known, babies are wont to wet or otherwise soil their diapers from time to time. This requires changing into a fresh diaper. The carrying of fresh diapers and finding a reasonable place to change a baby's diaper away from home are not always easy. As a result, a baby may go unchanged for some time. This makes the baby uncomfortable and fussy.

OBJECT AND SUMMARY OF THE PRESENT INVENTION

In view of the foregoing it is an object of the present invention to provide a coin operated baby changing station or apparatus providing a platform for supporting a baby and dispensing a fresh disposable diaper and accessories.

In carrying out the above and other objects of the present invention I provide a dispensing machine having means for accepting one or more coins. The coin mechanism releases a latch permitting a supporting platform or table to fold down from the front of the machine and on which a baby may be placed. Simultaneously, the machine dispenses a package containing a fresh disposable diaper and accessories, such as lotion, a moist paper towel, and perhaps baby powder.

Paper towels are supplied from the dispensing machine for drying the baby before application of the fresh diaper. A safety belt is provided to prevent a baby from rolling from the table.

THE DRAWINGS

The invention will best be understood with reference to the ensuing specification when taken in connection with the accompanying drawings wherein:

FIG. 1 is a perspective view of a dispensing apparatus or machine constructed in accordance with the principles of the present invention, showing the table in open position, FIG. 2 is a front view of the apparatus in closed position; and FIG. 3 is a side view of the apparatus in open position.

DETAILED DESCRIPTION OF THE ILLUSTRATED EMBODIMENT

Referring now to the drawings in greater detail, there will be seen a baby changing apparatus or station 10 constructed in accordance with the principles of the present invention, and comprising a coin operated vending apparatus. In particular, there is a rectangular cabinet 12 secured to a wall 14 by any suitable means, and preferably in a ladies restroom. The housing 12 is pivotable away from the back 16 thereof, and is held in place by a key operated latch 18 of known construction. A coin receiving mechanism for receiving a suitable coin or coins is disposed on the housing at 20, and is of known construction. The housing 12 contains a stack of small packages 22 each containing a disposable diaper, and suitable accessories such as a moist paper towel, lotion and baby powder. Suitable vending apparatus, which may be of known construction, is contained within the housing to eject a package 22 from a slot 24 in one end of the machine when suitable coins are deposited in the coin receiving mechanism 20. One suitable apparatus, specifically for vending diapers, is disclosed in U.S. Pat. No. 4,046,243.

The front of the housing 12 is recessed at 26, and a table or platform 28 is hinged to fit within the recess, by means such as a continuous plastic hinge 30. The table or platform 28, like the remainder of the housing 12, is conveniently molded of fibre reinforced plastic, and is provided with a dished surface 32 facing upwardly with the table in horizontal position as shown in FIGS. 1 and 3. The dished surface inhibits rolling about of a baby. The table is provided with apertures 34 for ventilation, and for draining of moisture.

Links 36 are mounted on pivot pins 38 on opposite ends of the table 28, and have pins 40 at the upper ends thereof received in vertical tracks 42 to permit sliding of the pins 40. The pins 40 bottom in the lower ends of the track 42 to hold the table 28 in horizontal position as illustrated in FIGS. 1 and 3.

The outer edge of the table is provided at its midpoint with a latch element 44 which preferably is U-shaped. The housing is recessed at 46 to accomodate the latch element 44 with the table in raised position. A movable latch member 48 projects down into the recessed area 46 and is provided with a camming front surface 50 to permit closing of the table at which position the latch member overlies the latch element to hold the table in raised position. An electro magnetic latch release 50 cooperates with the latch member 48 to move the same to releasing position when appropriate coins are inserted in the coin mechanism 20, thereby to allow the table to be lowered.

A safety belt 52 is disposed within the housing on a spring retractor 54 immediately below the recess 26 in the housing, and is designed to overlie a baby represented in highly schematic fashion at 56. The safety belt 52 has a preferably metal hook 58 on the end thereof designed to interfit with the U-shaped latch element 44 as shown in FIG. 3 to hold the safety belt in retaining position about a baby, and thus to prevent the baby from rolling off of the table 28.

A roll of paper towels 60 is suitably mounted at 62 within the upper portion of the housing 12 with towels 64 exiting through a guideway 70 into the upper portion of the recess 26 of the housing 12.

As noted heretofore, the baby changing apparatus 10 is conveniently located in a ladies restroom, although it may be located in other more or less public locations. When it is desired to change a baby's diaper appropriate coins are deposited in the coin mechanism 20, and the table or platform 28 is released so that it may drop of its own weight or be pulled open to horizontal position. At the same time a package 22 is vended through the slot 24. A paper towel 68 may be torn from the roll and placed on the surface of the table 28, with the baby then being placed on the towel and restrained by the safety belt 52. The diaper is then changed on the baby in the conventional manner with a moist paper towel used for conventional cleaning of the baby, lotion and baby powder subsequently being applied. The used diaper is disposed of in a nearby waste container along with the remnants of the dispensed package. The paper towel is similarly disposed of and the platform or table is manually raised by the user to vertical, latched position ready for another use.

Various changes in structure will no doubt occur to those skilled in the art. Such changes might well include substitution of stainless steel for the molded fibre reinforced plastic construction of the housing and table. All changes will be understood as forming a part of the present invention insofar as they fall within the spirit and scope of the appended claims.

The invention is claimed as follows:

1. Baby changing apparatus comprising a housing having therein packages of disposable diapers and having coin control means for dispensing such packages from said housing, a table hingedly supported from said housing for pivotal movement between vertical storage and horizontal operating positions, means for supporting said table in horizontal operating position, said table having a recessed surface which faces upwardly with said table in horizontal position and on which a baby may be disposed for diaper changing, latch means for holding said table in vertical position, and electrically operable latch release means therefor for permitting said table to move to horizontal position.

2. Apparatus as set forth in claim 1 and further including means for supporting paper toweling within said housing, and exit means in said housing for said paper toweling said table in vertical position covering said exit means.

3. Baby changing apparatus as set forth in claim 1 and further including a safety belt adapted to be latched across said table to hold a baby on said recessed surface.

4. Baby changing apparatus as set forth in claim 1 wherein said recessed surface is apertured.

* * * * *